United States Patent
Yasumaru

[11] Patent Number: 6,148,155
[45] Date of Patent: Nov. 14, 2000

[54] CAMERA HAVING A FILM CARTRIDGE CHAMBER

[75] Inventor: Ichiro Yasumaru, Mishima, Japan

[73] Assignee: Canon Kabushiki Kaisha, Tokyo, Japan

[21] Appl. No.: 09/212,220

[22] Filed: Dec. 16, 1998

[30] Foreign Application Priority Data

Dec. 22, 1997 [JP] Japan ................................. 9-364856

[51] Int. Cl.[7] .................................................. G03B 17/02
[52] U.S. Cl. ........................................... 396/536; 396/538
[58] Field of Search .............................. 396/6, 388, 413, 396/429, 535, 536, 538

[56] References Cited

U.S. PATENT DOCUMENTS

| | | | |
|---|---|---|---|
| 3,679,148 | 7/1972 | Daitoku et al. | 396/413 |
| 4,324,470 | 4/1982 | Terunuma | 396/388 |
| 4,401,379 | 8/1983 | Tamamura et al. | 396/413 |
| 5,311,231 | 5/1994 | Suzuki et al. | 396/6 |
| 5,619,298 | 4/1997 | Stiehler | 396/388 |

*Primary Examiner*—Eddie C. Lee
*Attorney, Agent, or Firm*—Robin, Blecker & Daley

[57] ABSTRACT

A camera includes a film cartridge chamber in which a film cartridge having a rotating shaft is loaded, a cartridge chamber lid for covering a loading port of the film cartridge chamber, the cartridge chamber lid being supported to be openable and closable on the camera and having an opening part extending from outside into the film cartridge chamber in such a position as to face a predetermined part of the rotating shaft of the film cartridge loaded in the film cartridge chamber, an exterior part mounted on the cartridge chamber lid and capable of coming into one of a state to cover the opening part and a state not to cover the opening part, and a holding part arranged to hold the rotating shaft by abutting on the predetermined part of the rotating shaft, the holding part holding the rotating shaft in a state of being situated in a predetermined position between the exterior part and the predetermined part of the rotating shaft, and the holding part being removable from the predetermined position through the opening part when the exterior part is in the state not to cover the opening part.

20 Claims, 3 Drawing Sheets

CAMERA HAVING A FILM CARTRIDGE CHAMBER

BACKGROUND OF THE INVENTION

1. Field of the Invention

The present invention relates to a camera having a film cartridge chamber in which a film cartridge is loaded.

2. Description of Related Art

Cameras adapted for use of a film cartridge of the type permitting film feeding by thrust driving have heretofore been arranged to be loaded with the film cartridge by inserting and taking out the film cartridge through an output port having an opening which is a little larger than the film cartridge. In other words, the camera of this kind is arranged to obviate the necessity of a large opening-and-closing member which is called a back cover and conventionally arranged to expose every thing including a film take-up spool and a photo-taking aperture provided on the side of the body of the camera. Further, the camera of this kind is provided with a holding means for constantly holding the film cartridge of the above-stated type and is arranged to permit driving the film cartridge from outside through the holding means.

A camera disclosed in Japanese Laid-Open Patent Application No. HEI 9-211607 has a cartridge operating device which is composed of a spool driving means for driving the film supply spool of a film cartridge, a holding means for constantly holding the film cartridge after the camera is loaded with the film cartridge, and an operating means disposed at the holding means for driving the film supply spool from outside by engaging the film supply spool. Such a cartridge operating device is configured compactly, and when it has become impossible to rewind the film into the film cartridge, the spool driving means permits rewinding the film back into the film cartridge without opening the lid of a cartridge loading chamber, by operating the operating means.

Further, an optical apparatus disclosed in Japanese Laid-Open Patent Application No. HEI 9-222663 has an external driving means arranged such that, in a rewinding into a film cartridge a film which has come to a stop halfway in process of film transport, the external driving means permits a spool driving means to be driven from outside of the camera body for the purpose of preventing reexposure of exposed frames of the film from being made by opening a back cover with which an aperture part is covered.

According to the prior art examples cited above, however, it is impossible to take out a film cartridge from the camera in a case where the film happens to stick inside the camera and does not allow film winding or rewinding by thrust driving.

Further, according to the arrangement disclosed in Japanese Laid-Open Patent Applications No. HEI 9-211607 and No. HEI 9-222663, the film cartridge is held by a rotatable holding means and the holding means is driven from outside when it has become impossible to wind or rewind the film by thrust driving. This arrangement, however, causes an increase in size of an opening-and-closing lid of the film cartridge chamber which includes the holding means arranged to rotatably hold the opening-and-closing lid.

BRIEF SUMMARY OF THE INVENTION

In view of the problems mentioned above, it is an object of the invention to provide a camera having a cartridge chamber opening-and-closing lid arranged to permit, without increasing its size, a film winding-or-rewinding operation to be carried out without opening the lid in a case where a film in a film cartridge loaded on the camera happens to become no longer windable or rewindable.

To attain the above object, in accordance with an aspect of the invention, there is provided a camera, which comprises a film cartridge chamber in which a film cartridge having a rotating shaft is loaded, a cartridge chamber lid for covering a loading port of the film cartridge chamber, the cartridge chamber lid being supported to be openable and closable on the camera and having an opening part extending from outside into the film cartridge chamber in such a position as to face a predetermined part of the rotating shaft of the film cartridge loaded in the film cartridge chamber, an exterior part mounted on the cartridge chamber lid and capable of coming into one of a state to cover the opening part and a state not to cover the opening part, and a holding part arranged to hold the rotating shaft by abutting on the predetermined part of the rotating shaft, the holding part holding the rotating shaft in a state of being situated in a predetermined position between the exterior part and the predetermined part of the rotating shaft, and the holding part being removable from the predetermined position through the opening part when the exterior part is in the state not to cover the opening part, so that a part of the shaft of the film cartridge can be exposed to the outside with the cartridge chamber lid remaining closed, and the shaft of the film cartridge can be rotated as necessary by causing a tool or the like to abut directly on a part of the shaft of the film cartridge.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
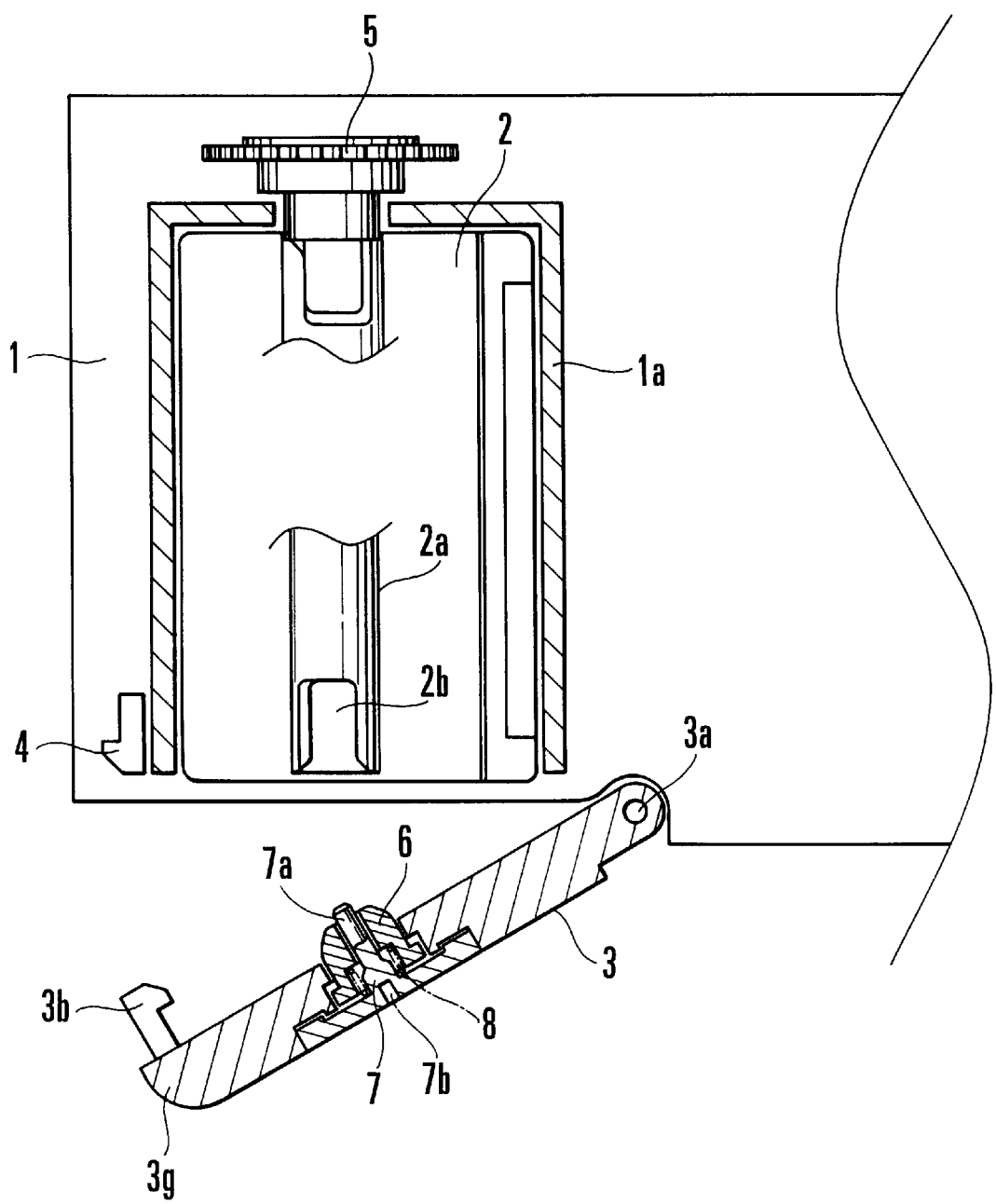
FIG. 1 is a sectional view showing an opening-and-closing lid of a cartridge chamber of a camera according to an embodiment of the invention.

FIG. 1 is a sectional view showing an opening-and-closing lid of a cartridge chamber of a camera according to the embodiment. Referring to FIG. 1, a camera body 1 is provided, on the left-hand side or right-hand side thereof, with a cartridge chamber 1a in which a film cartridge 2 is loaded. The opening-and-closing lid 3, to which a member for rotatably holding the film cartridge 2 is attached, is provided for covering the cartridge chamber 1a and is mainly composed of a lid body 3g. Further, the opening-and-closing lid 3 is pivotally connected to the camera body 1 by a hinge shaft part 3a provided on one side of the lid body 3g. A claw 3b which is provided on the other side of the lid body 3g allows the opening-and-closing lid 3 to be engaged with and locked to the camera body 1. A lock claw 4 which is provided in the camera body 1 is arranged to engage the claw 3b when the opening-and-closing lid 3 is closed to cover the cartridge chamber 1a. A fork gear 5 is arranged to engage one end of a cartridge shaft 2a of the film cartridge 2 and to be caused by a thrust driving gear train to send the film out from the film cartridge 2. A cartridge holding ball 6 is arranged to rotatably hold the other end of the cartridge shaft 2a of the film cartridge 2. An exterior plate 7, which is mounted on the opening-and-closing lid 3, for example, by cementing or bonding or the like, is provided with a shaft part 7a which allows the cartridge holding ball 6 to move up and down and to rotate thereon and a screw hole 7b which is formed on the surface side of the exterior plate 7. A ball spring 8 is arranged to cause the cartridge holding ball 6 to move toward the cartridge shaft 2a of the film cartridge 2.

In the structural arrangement as shown in FIG. 1, after the film cartridge 2 is loaded into the cartridge chamber 1a, the opening-and-closing lid 3 is closed from the state shown in FIG. 1 to fit the cartridge holding ball 6 into the cartridge shaft 2a. Then, the claw 3b is fitted into the camera body 1 to let the claw 3b engage the lock claw 4. Further, one end of the cartridge shaft 2a of the film cartridge 2 comes to engage the fork gear 5 which is disposed on the ceiling side of the camera body 1. The fork gear 5 is arranged to be caused by the thrust driving gear train (not shown) to act to send the film out from the film cartridge 2. Since the cartridge holding ball 6 is inserted into a recessed part 2b formed at the other end of the cartridge shaft 2a, the cartridge shaft 2a can be always stably rotated by the fork gear 5.

Figure 2:
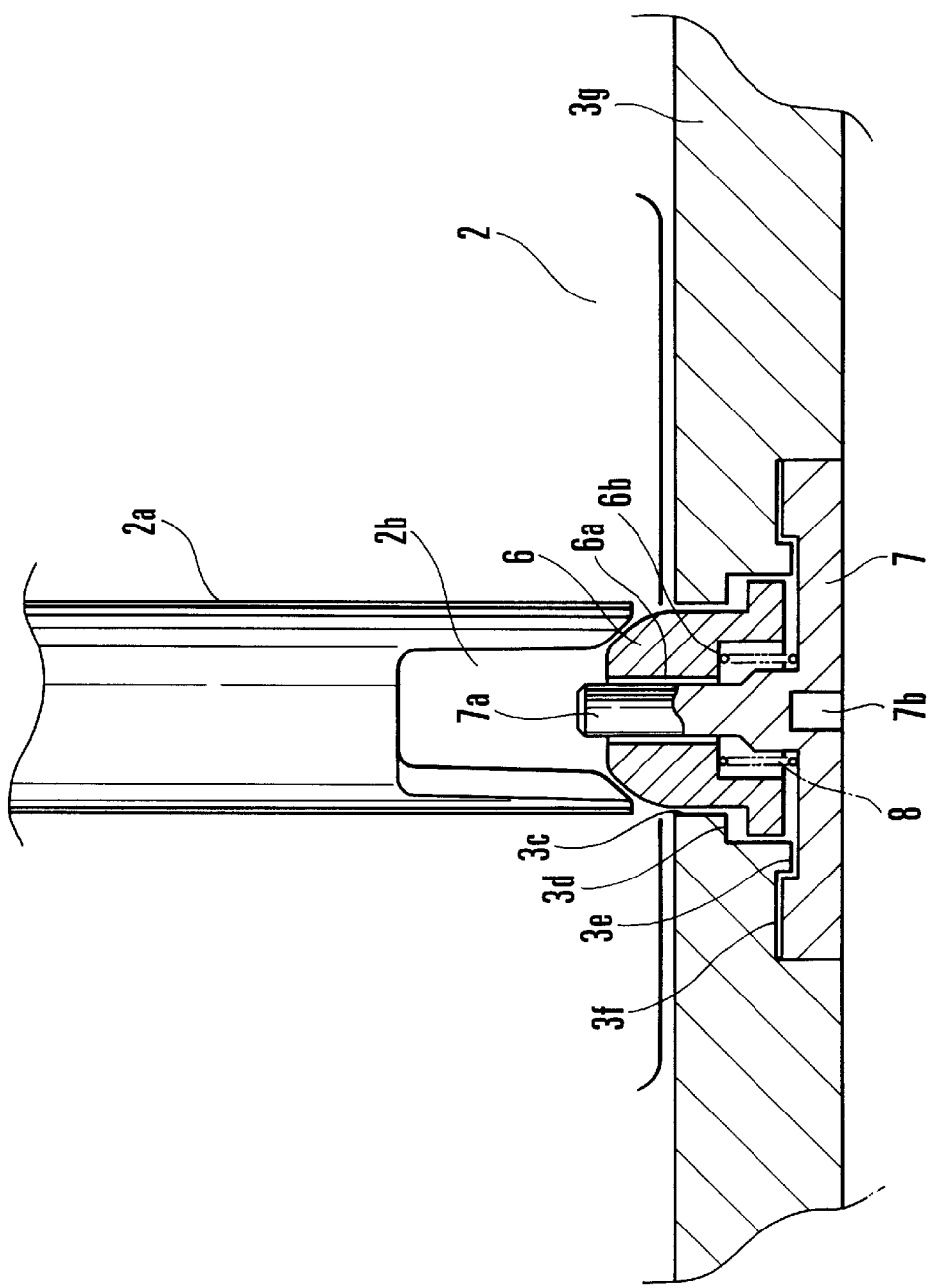
FIG. 2 is a sectional view showing in detail the arrangement of an engagement part where the opening-and-closing lid and a cartridge holding ball engage each other.

FIG. 2 is a sectional view showing in detail the arrangement of an engagement part where the opening-and-closing lid 3 and the cartridge holding ball 6 engage each other. The opening-and-closing lid 3 is provided with an opening part 3c of an inner diameter large enough to permit the cartridge holding ball 6 to move up and down and to rotate there. The cartridge holding ball 6 is set within a space defined by the opening part 3c and a first wall part 3d. Further, the cartridge holding ball 6 is provided with a hole 6a which is fitted on the shaft part 7a of the exterior plate 7 and a spring bearing part 6b which has the ball spring 8 placed therein. In the engagement part configured as described above, the shaft part 7a of the exterior plate 7 is formed to be smaller than the inner diameter of the hole 6a and that of the ball spring 8, so that, after the ball spring 8 is inserted into the spring bearing part 6b, the shaft part 7a of the exterior plate 7 is inserted into the hole 6a in such a way as to allow the cartridge holding ball 6 to move up and down and to rotate. Therefore, the cartridge holding ball 6 is vertically movable and rotatable on the shaft part 7a of the exterior plate 7. When the cartridge holding ball 6 thus moves, the cartridge holding ball 6 comes to abut on the first wall 3d which is arranged to act as a stopper in the vertical direction. Therefore, when the cartridge holding ball 6 is not abutting on the film cartridge 2, it abuts on the first wall 3d. With the film cartridge 2 loaded in position within the cartridge chamber 1a, the cartridge holding ball 6 is pushed by the cartridge shaft 2a away from the first wall 3d to be rotatable in a state of abutting on the cartridge shaft 2a. When the exterior plate 7 is mounted on the opening-and-closing lid 3, the position in the direction of thrust of the exterior plate 7 is set as the exterior plate 7 is caused to abut on a second wall 3e of the opening-and-closing lid 3. The second wall 3e is provided with a recessed part 3f which is indented by one step from the outer side of the second wall 3e. The exterior plate 7 is cemented at the recessed part (cementing part) 3f.

This arrangement ensures that a sufficient clearance is provided there for the rotation and the vertical motion of the cartridge holding ball 6.

Figure 3:
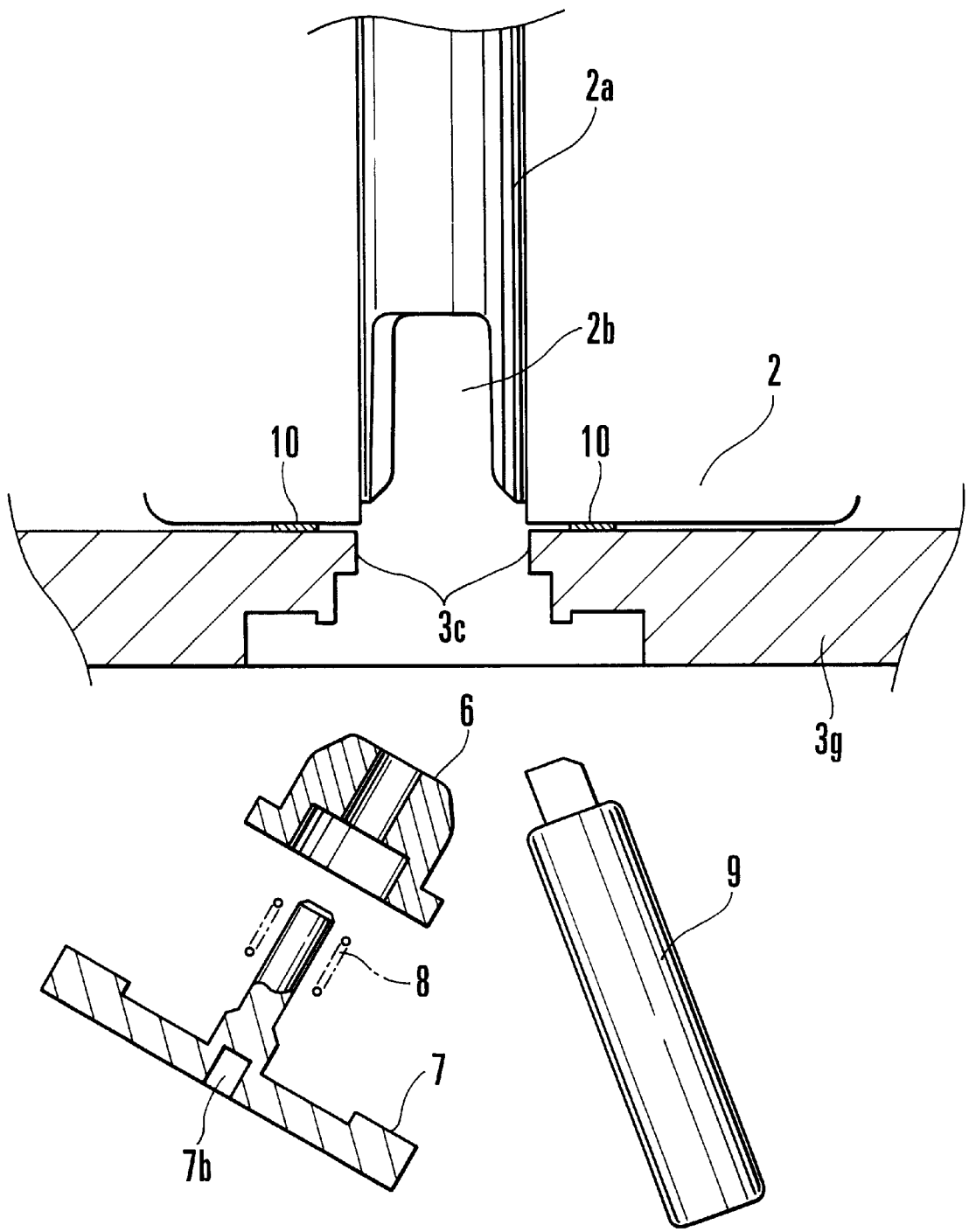
FIG. 3 is a diagram for explaining the method of rewinding the film by driving from outside when the film has become no longer transportable by thrust driving.

FIG. 3 is a diagram for explaining the method of rewinding the film by driving from outside when the film has become no longer transportable by thrust driving. Referring to FIG. 3, after the opening-and-closing lid 3 is closed with the film cartridge 2 loaded in the cartridge chamber 1a, if the film in process of transport happens to become immovable by thrust driving, a screw (not shown) is first inserted into the screw hole 7b provided in the outer surface of the exterior plate 7. Then, when a force is applied to remove the exterior plate 7 from the opening-and-closing lid 3, the exterior plate 7 which is cemented at the recessed part 3f can be peeled off the opening-and-closing lid 3. With the exterior plate 7 removed, the cartridge holding ball 6 and the ball spring 8 which have been disposed on the inner side of the opening-and-closing lid 3 can be removed. By this operation, all the parts mounted on the opening-and-closing lid 3 can be removed. As a result, the opening part 3c of the opening-and-closing lid 3 becomes open. Then, a film winding shaft 9 is inserted into the opening part 3c. Since the tip of the film winding shaft 9 is formed to engage the cartridge shaft 2a for causing the cartridge shaft 2a to rotate, the cartridge shaft 2a is rotated by rotating the film winding shaft 9. With the film winding shaft 9 thus rotated, the film is taken up and wound on the cartridge shaft 2a. After the film is taken up in this manner, the film winding shaft 9 is removed and the opening-and-closing lid 3 is opened to enable the film cartridge to be taken out from the cartridge chamber 1a.

When the film driving-and-holding part which includes the exterior plate 7, etc., mounted on the opening-and-closing lid 3 is removed, the film loaded in the camera might be exposed to incident external light through the opening part 3c provided in the opening-and-closing lid 3. The accidental exposure can be prevented by disposing, as shown in FIG. 3, a light-blocking member 10 which is made of a suitable material such as polyurethane foam. The accidental exposure also can be prevented by removing the film driving-and-holding part within a dark box or the like, which dispenses with the light blocking member 10. Further, while the exterior plate 7 is removed by using the screw hole 7b, it is also possible to provide a recessed part in the opening-and-closing lid 3 at a peripheral part of the exterior plate 7 and to wrench the exterior plate 7 by using the recessed part.

As described above, the film driving-and-holding part which includes the exterior plate 7 is removably mounted on the opening part 3c of the opening-and-closing lid 3. With the opening-and-closing lid 3 configured in this manner, when a thrust driving action on the film by a film transport gear system has become impossible, the cartridge shaft 2a can be directly driven from outside by removing the whole film driving-and-holding part. The embodiment thus dispenses with a key, which is heretofore arranged on the side of the opening-and-closing lid to engage the cartridge shaft, so that the opening-and-closing lid can be more compactly arranged with a lesser number of parts than the arrangement of the prior art described in the foregoing.

In the case of the embodiment described above, the invention is applied to a camera as an optical apparatus. However, the invention is not limited to cameras but is applicable also to optical apparatuses of other kinds as long as they are arranged to have a cartridge chamber and an opening-and-closing lid for the cartridge chamber.

Further, while the exterior plate 7 is attached to the opening-and-closing lid 3 by cementing or bonding, the cementing arrangement may be replaced with some engaging mechanism which includes a claw part provided on the opening-and-closing lid and a recessed part formed on the side of the camera body and arranged to secure the exterior plate 7 in position. If an increase in number of parts is allowable, it is also possible to secure the exterior plate 7 by means of a screw. In that case, the screw hole 7*b* mentioned above is not necessary.

In a case where the exterior plate 7 is provided with the screw hole 7*b* as described above, the position of the screw hole 7*b* is not limited to the middle part of the exterior plate 7 but may be formed in any other suitable portion.

As a modification of the embodiment, such an arrangement is conceivable that the exterior plate 7 is supported on the opening-and-closing lid 3 so as to be movable from a position to cover the opening part 3*c* to a position not to cover the opening part 3*c*, or that the exterior plate 7 is joined to the opening-and-closing lid 3 by means of a string or the like.

As described above, the embodiment is arranged to have the exterior plate removably mounted on the surface of the body of the opening-and-closing lid, to have the tip part of the exterior plate formed to be fitted into the rotating shaft of the film cartridge, and to have a cartridge holding member arranged between the opening-and-closing lid body and the exterior plate to be in a loosely movable state. Therefore, even when the film of the film cartridge loaded in the camera becomes immovable by film winding and rewinding actions, the film can be wound and rewound by simply removing only the exterior plate and by simply inserting a tool from outside without opening the opening-and-closing lid.

In the embodiment described above, the exterior plate is provided with a shaft part which is arranged to rotatably support the cartridge holding member and the urging means which is arranged to urge the cartridge holding member to move toward the film cartridge. The cartridge shaft is, therefore, always stably held by the cartridge holding member.

According to the arrangement of the embodiment described above, the exterior plate is cemented in such a way as to be easily peeled off the body of the opening-and-closing lid. The exterior plate, therefore, can be readily removed.

Further, according to the arrangement of the embodiment described above, the exterior plate is provided with a removing hole. Therefore, the exterior plate can be easily removed by inserting something like a screw into this hole and by applying a force to the exterior plate.

Further, while the invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

The individual components shown in schematic or block form in the drawings are all well known in the camera arts and their specific construction and operation are not critical to the operation or best mode for carrying out the invention.

The invention may be carried out by combining as necessary the embodiments or their technological elements described in the foregoing.

The invention applies to cases where either the whole or a part of claims or the arrangement of each embodiment described forms one apparatus or is used in combination with some other apparatus or as a component element of an apparatus.

Further, the invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

What is claimed is:

1. A camera comprising:
    a film cartridge chamber in which a film cartridge having a rotating shaft is loaded;
    a cartridge chamber lid for covering a loading port of said film cartridge loading chamber, sad cartridge chamber lid being supported to be openable and closable on said camera and having an opening part extending from outside into said film catridge chamber in such a position as to face a predetermined part of the rotating shaft of the film cartridge loaded into said film cartridge chamber;
    an exterior part mounted an said cartridge chamber lid and capable of coming into one of a state to cover said opening part and a state not to cover said opening part;
    a holding part arranged to hold the rotating shaft by abutting on the predetermined part of the rotating shaft, said holding part holding the rotating shaft in a state of being situated in a predetermined position between the exterior part and the predetermined part of the rotating shaft, and said holding part being removable from the predetermined position through said opening part when said exterior part is in the state not to cover said opening part;3 and
    urging means positioned between and supported by said holding part and said exterior part for giving a urging force to said holding part to move toward the rotating shaft of the film cartridge.

2. A camera according to claim 1, wherein said holding part includes means for being supported to be movable with respect to said exterior part.

3. A camera according to claim 2, wherein said holding part includes means for being supported to be movable at least in directions along the rotating shaft of the film cartridge when said cartridge chamber lid is in a closed state.

4. A camera according to claim 3, wherein said opening part includes a space for enabling said holding part to move in directions along the rotating shaft of the film cartridge.

5. A camera according to claim 2, wherein said holding part includes means for being supported to be rotatable with respect to said exterior part.

6. A camera according to claim 5, wherein said opening part includes a space for enabling said holding part to rotate with respect to said exterior part.

7. A camera according to claim 2, wherein said holding part includes means for being supported to be rotatable around a shaft coaxial with the rotating shaft of the film cartridge when said cartridge chamber lid is in a closed state.

8. A camera according to claim 7, wherein said opening part includes a space for enabling said holding part to rotate with respect to said exterior part.

9. A camera according to claim 1, wherein said urging means includes elastic means.

10. A camera according to claim 1, wherein said exterior part includes a portion having a first width in a radial direction of said opening part, and said holding part includes a portion having a second width different from the first width in the radial direction of said opening part.

11. A camera according to claim 10, wherein said opening part has a first inner diameter portion in which said exterior part is located and a second inner diameter portion in which said holding part is located, an inner diameter of said second inner diameter portion being different from an inner diameter of said first inner diameter portion.

12. A camera according to claim 10, wherein the second width of the portion of said holding part is smaller than the first width of the portion of said opening part.

13. A camera according to claim 12, wherein said opening part has a first inner diameter portion in which said exterior part is located and a second inner diameter portion in which said holding part is located, an inner diameter of said second inner diameter portion being smaller than an inner diameter of said first inner diameter portion.

14. A camera according to claim 13, wherein said second inner diameter portion is located closer to the film cartridge than said first inner diameter portion when said cartridge chamber lid is in a closed state.

15. A camera according to claim 1, wherein said holding part includes a portion having a first width in a radial direction of said opening part and a portion having a second width smaller than the first width in the radial direction of said opening part.

16. A camera according to claim 15, wherein said opening part has a first inner diameter portion having an inner diameter larger than the first width and a second inner diameter portion having an inner diameter smaller than the first width and larger than the second width.

17. A camera according to claim 16, wherein the portion having the first width of said holding part has a first height in a direction perpendicular to a diameter of said opening part, and said first inner diameter portion has a second height larger than the first height in the direction perpendicular to the diameter of said opening part.

18. An optical apparatus comprising:

a film cartridge chamber in which a film cartridge having a rotating shaft is loaded;

cartridge chamber lid for covering a loading port of said film cartridge loading chamber, said cartridge chamber lid being supported to be openable and closable on said optical apparatus and having an opening part extending from outside into said film cartridge chamber in such a position as to face a predetermined part of the rotating shaft of the film cartridge loaded into said film cartridge chamber;

an exterior part mounted on said cartridge chamber lid and capable of coming into one of a state to cover said opening part and a state not to cover said opening part;

a holding part arranged to hold the rotating shaft by abutting on the predetermined part of the rotating shaft, said holding part holding the rotating shaft in a state of being situated in a predetermined position between the exterior part and the predetermined part of the rotating shaft, and said holding part being removable from the predetermined position through said opening part when said exterior part is in the state not to cover said opening part; and urging means positioned between and supported by said holding part and said exterior part for giving an urging force to said holding part to move toward the rotating shaft of the film cartridge.

19. A camera comprising:

a film cartridge chamber;

a cartridge chamber lid for covering a loading part of said film cartridge chamber, said cartridge chamber lid being supported to be openable and closable on said camera and having an opening part extending from outside into said film cartridge chamber in facing relation with said film cartridge chamber;

an exterior part mounted on said cartridge chamber lid and capable of coming into one of a state to cover said opening part and a state not to cover said opening part;

a film cartridge holding part retentively held by sad exterior part and said cartridge chamber lid and moveable with said cartridge chamber lid upon opening thereof; and urging means positioned between and supported by said film cartridge holding part and said exterior part for giving an urging force to said part to move toward a rotating shaft of the film cartridge.

20. An optical apparatus comprising:

a film cartridge chamber;

a cartridge chamber lid for covering a loading port of said film cartridge chamber, said cartridge chamber lid being supported to be openable and closable on said optical apparatus and having an opening part extending from outside into said film cartridge chamber in facing relation with said film cartridge chamber;

an exterior part mounted on said cartridge chamber lid and capable of coming into one of a state to cover said opening part and a state not to cover said opening part;

a film cartridge holding part retentively held by said exterior part and said cartridge chamber lid and movable with said cartridge chamber lid upon opening thereof; and urging means positioned between and supported by said film cartridge holding part and said exterior part for giving an urging force to said film cartridge holding part to move toward a rotating shaft of the film cartridge.

* * * * *

UNITED STATES PATENT AND TRADEMARK OFFICE
CERTIFICATE OF CORRECTION

PATENT NO.   : 6,148,155                                 Page 1 of 1
DATED        : November 14, 2000
INVENTOR(S)  : Ichiro Yasumaru It is certified that error appears in the above-identified patent and that said Letters Patent is hereby corrected as shown below:

Column 6,
Line 22, delete "mounted an" and insert -- mounted on --.
Line 33, delete "part; 3 and" and insert -- part; and --.

Column 8,
Line 24, delete "by sad" and insert -- by said --.
Line 30, delete "to said part" and insert -- to said film cartridge holding part --.

Signed and Sealed this

First Day of January, 2002

Attest:

Attesting Officer

JAMES E. ROGAN
Director of the United States Patent and Trademark Office